(12) United States Patent
Woodward (10) Patent No.: US 9,342,277 B2
(45) Date of Patent: May 17, 2016

(54) METHOD OF SEARCHING DATA ASSOCIATED WITH NODES OF A GRAPHICAL PROGRAM

(71) Applicant: Oracle International Corporation, Redwood Shores, CA (US)

(72) Inventor: Richard James Woodward, Havelock North (NZ)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 109 days.

(21) Appl. No.: 13/828,005

(22) Filed: Mar. 14, 2013

(65) Prior Publication Data

US 2014/0282364 A1  Sep. 18, 2014

(51) Int. Cl.
  *G06F 9/44* (2006.01)
(52) U.S. Cl.
  CPC .......................................... *G06F 8/34* (2013.01)
(58) Field of Classification Search
  CPC ..................................... G06F 8/34; G06F 8/10
  USPC .................. 717/105, 109, 113, 125
  See application file for complete search history.

(56) References Cited

U.S. PATENT DOCUMENTS

| | | | |
|---|---|---|---|
| 7,680,939 B2* | 3/2010 | Trevor et al. ................... | 709/226 |
| 7,844,640 B2* | 11/2010 | Bender et al. .................. | 707/805 |
| 7,949,569 B2 | 5/2011 | Maes ............................... | 705/26 |
| 8,327,280 B2 | 12/2012 | Nattinger ....................... | 715/763 |
| 8,464,221 B2* | 6/2013 | Zheng et al. ................... | 717/124 |
| 2003/0101253 A1* | 5/2003 | Saito et al. .................... | 709/223 |
| 2006/0074870 A1* | 4/2006 | Brill et al. ......................... | 707/3 |
| 2006/0143570 A1* | 6/2006 | Washington et al. .......... | 715/763 |
| 2007/0172040 A1* | 7/2007 | Cesarini et al. ............... | 379/126 |
| 2010/0011302 A1* | 1/2010 | Stein et al. ..................... | 715/753 |
| 2012/0158553 A1* | 6/2012 | Sudhidhanakul et al. ...... | 705/28 |
| 2014/0074888 A1* | 3/2014 | Potter et al. ................... | 707/779 |

* cited by examiner

*Primary Examiner* — Anna Deng
(74) *Attorney, Agent, or Firm* — Precision IP (57) ABSTRACT

A method and apparatus for searching data associated with nodes of a visual or graphical program. The method may include the acts of searching information stored in memory using search criteria that was entered into a search box of a Graphical User Interface. The information searched is associated with nodes of the graphical program. In response to the searching, identifying one or more of the nodes. In one embodiment, the method may further include displaying one or more links corresponding to the identified one or more of the nodes, respectively, in response to the identifying.

24 Claims, 11 Drawing Sheets

METHOD OF SEARCHING DATA ASSOCIATED WITH NODES OF A GRAPHICAL PROGRAM

BACKGROUND

In computing, graphical programming (also known as visual programming) lets users create programs by manipulating program elements graphically rather than by specifying them textually. A graphical program may include a plurality of visually interconnected nodes that collectively indicate functionality. The graphical program may be represented in memory of a computer system as integrated data structures and/or program instructions. These data structures and/or program instructions may be compiled or interpreted to produce machine language that accomplishes the functionality of the graphical program.

A user may build a graphical program via a graphical user interface (GUI) by selectively adding various nodes that represent various functions. The nodes may be connected by lines representing data flow, control flow, or execution flow. Thus the graphical program may include a plurality of interconnected nodes that graphically defines a procedure for accomplishing certain results, such as manipulating one or more input variables and/or producing one or more output variables.

The GUI may include various user interface panels. A canvas panel of the GUI displays the graphical program. A palette panel may include a list of distinct nodes that can be dragged and dropped by the user onto the canvas panel as node instances. Nodes placed on the canvas panel inherit the attributes and properties of the nodes of the palette panel. Once placed on the canvas panel, a user can configure the nodes with data in accordance with the functions they will perform, and connect the nodes to create a program control flow. When finished the instructions and/or data structures representing the interconnected nodes, including the configuration data, can be stored in memory for subsequent compilation or interpretation into machine code.

SUMMARY

A method and apparatus for searching data associated with nodes of a graphical program. The method may include the acts of searching information stored in memory using search criteria that was entered into a search box of a GUI. The information searched is associated with nodes of the graphical program. In response to the searching, the method further includes the act of identifying one or more of the nodes. In one embodiment, the method may further include displaying one or more links corresponding to the identified one or more of the nodes, respectively, in response to the identifying.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Overview

Graphical programming can be used in many businesses to create different types of complex programs. A communication service provider (CSP) is an example of one type of business that employs graphical programming. The present invention will be described with reference to creating or modifying graphical programs for use by CSPs, it being understood the present invention should not be limited thereto.

CSPs offer numerous services to customers via one or more wired and/or wireless communication systems. Example services include voice, data, texting, etc. Customers of CSP's can use these services via devices such as smart phones, tablet computers, etc. The present invention will be described with reference a CSP providing services to customers via smart phones it being understood the present invention should not be limited thereto.

CSPs provide services according to service plan agreements that specify the charges the customers pay for using the services. In prepaid service plan agreements credit is typically purchased by customers in advance and held in accounts. The purchased credit is applied when a service is used. If there is no available credit in the customer's account then use of the requested service is often denied. In post paid service plan agreements a customer typically enters a long-term contract (generally lasting 12, 18 or 24 months) or a short term contract (also commonly referred to as a rolling contract or a 30-day renewable contract) with the CSP. Post paid service plan agreements often limit the quantity of data or voice minutes used by the customers on a monthly basis. When a monthly limit is reached, customers may be charged for extra bytes of data, or customers may be charged for extra minutes of a telephone call.

An important aspect of the operation of a CSP is the efficient and accurate billing of customers for the services they use. CSPs implement a program commonly referred to as charging systems to track, control and charge customers use of services. Intelligent network (IN) systems is also a term that is used to designate systems that, for example, control telephony services (e.g. 1800 number service). Basically, a charging system can be fed data for all customer use of services such as telephone calls, and in response the charging system controls and charges for the individual customer's use.

Charging systems come in a variety of forms. Online charging systems (OCS) operate in real time. Offline charging systems (OFCS) typically operate on a batch process basis. The online charging system may include several logical functions such as a control function (including session based and event based control functions), a rating function (which essentially tells you how much a given service will cost), an account and balance management function (which updates and returns balances and statuses of accounts in real-time). The logical functions can be independent components, or they can be combined together as one component. For purposes of explanation only, the present invention will be described with reference to an online charging system that contains a control function that includes both session (e.g. voice calls, data sessions) based and event (e.g. SMS/text messages) based control functions. It should be understood that online charging systems may include additional functions.

When a customer request to use a service (e.g., internet access, telephone call, etc.) is received, a simple online charging system can authenticate the customer's identity and check the customer's account balance before giving authorization to use the requested service, immediately deduct fees from the customer's account, and terminate the service upon expiration of the customer's account balance. Online charging systems, however, can be substantially more complex. To illustrate, when a telephone call request is received, a more sophisticated online charging system may determine whether the request is for a new prepaid customer of the CSP, and if so the online charging system may determine whether the customer has activated an account for the requested service. If a new prepaid customer has not activated an account, the online charging system may send a pre-recorded message to the customer's smart phone, which asks the customer for information needed to activate an account. Complex online charging systems may also send short message notifications to customers after telephone calls to let them know the cost or duration of the calls. These are just a few examples of more complex online charging system functions.

Online charging systems may take form in a program or software instructions executing on one or more computers (e.g., severs). Prior to graphical programming, text based programming languages were used by teams of programmers to build new or modify existing online charging systems. Once built or modified, the text based online charging systems are translated to machine language level by translators known as compilers or interpreters, and subsequently implemented on dedicated servers.

Today CSPs seek to build new or modify existing online charging systems more quickly and cost effectively to retain and grow their market share. In addition online charging systems are becoming more complex as CSPs look to find ways to differentiate themselves from their competitors. Because online charging systems are becoming more complex, building new or modifying existing online charging systems is more costly, time consuming and can lead to significant rises in operating expenses when built or modified using traditional text based programming languages. The costs and time to completion, however, can be significantly reduced if graphical programming is used instead of text based programming. Graphical programming lets users, including non-technical users, more easily build or modify programs such as online charging systems by graphically manipulating program elements, such as nodes and data flow connections, rather than by specifying them textually.

As the complexity and size of graphical programs that represent online charging systems increase, however, graphical programming may introduce disadvantages. To illustrate, when a developer seeks to modify a graphical program, the developer may need to locate a particular node in order to reconfigure it or otherwise modify it. Visually locating a node of interest within a small graphical program is relatively easy. It will be substantially more challenging for a user to visually locate a particular node in a large, complex graphical program that includes hundreds or thousands of interconnected nodes. Large, complex graphical programs may also frustrate the ability of a developer to quickly diagnose and correct glitches with online charging systems as will be more fully described below.

The present invention addresses these problems and others by enabling a system and method for searching data (e.g., meta-data, configuration data, etc.) associated with nodes of a graphical program to identify nodes of interest. The present invention will be described with reference to a graphical program representation of an online charging system, it being understood that the present invention may find application in graphical programs that represent other types of systems.

In one embodiment, the present invention provides a search engine that can search data associated with nodes of interest using user selected search filters and/or user entered search criteria. The search engine can access associated data (e.g., configuration data, meta-data, etc.) corresponding to graphical program nodes in order to identify nodes that meet the entered criteria and/or selected filter. Once identified, a list of active links to the identified nodes can be presented to user via a GUI. Moreover, the list can be presented while the GUI displays a graphical program in which the identified nodes are contained. The user can activate a link, and in response the node corresponding to the activated link can be highlighted, centered and/or brought into focus within a canvas panel of the GUI. Configuration data, meta-data, user entered comments, etc., associated with the node can be also displayed in a separate inspection panel. Another benefit is that search results (i.e., the displayed list of active links to nodes identified by the search engine) can be generated in real time. Ultimately, the present invention may dramatically reduce the time and effort needed to build new or modify existing online charging systems.

Figure 1:
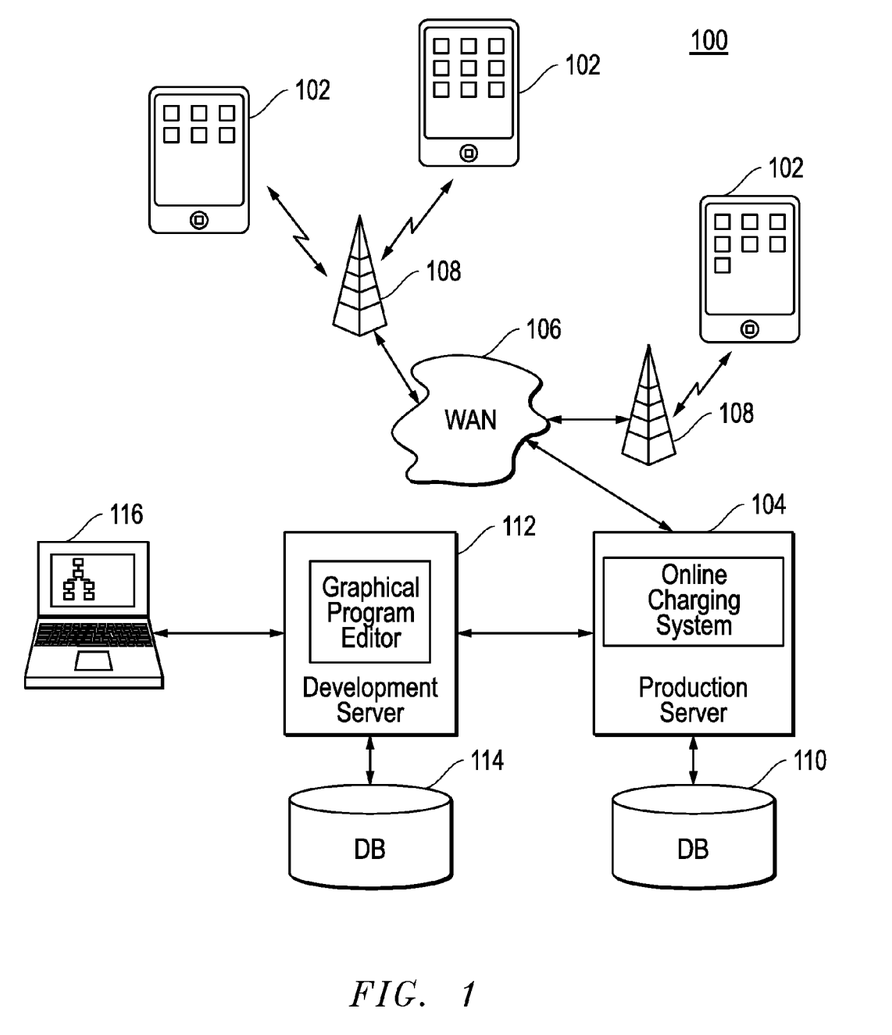
FIG. 1 illustrates components of an example system that implements one embodiment of the present invention.

FIG. 1 illustrates an example system 100 in which one embodiment of the present invention can be employed. While the present invention will be described with reference to the figures in this document, it should be understood, however, the claims filed in this document or any continuation application should not be limited to the embodiments shown in the figures or described herein.

System 100 includes several smart phones 102 that are capable of accessing services (e.g., voice, data, etc.) provided by a CSP via wired and wireless communication systems. Customers are charged by the CSP via one or more online charging systems executing or running on production server 104, which may be in data communication with smart phones 102 via wide area network(s) 106 and radio access networks 108. For the purposes of explanation only, it will be presumed that production server 104 implements only one online charging system that takes form in instructions executing on one or more processors. These instructions can be stored in memory of server 104.

Production server 104 is in data communication with database 110, which stores information related to each of the customers and their smart phones 102. Customer information may include customer account data, customer profile data, service records, etc. The online charging system executing on production server 104 is in data communication with database 110 and can use the information contained therein during online charging operations. The online charging system may also update information in database 110 with each call or other service request initiated by a customer. In one embodiment, results generated by the online charging system may depend on customer account and profile data. Service records stored in database 110 often contain information related to services such as telephone calls, including the origination and destination of the call, the time the call started and ended, the duration of the call, the time of day the call was made, a trace (more fully described below), charges for the call, etc.

Production server 104 is in data communication with an example online charging system development server 112, which in turn is in data communication with a development database 114 that stores graphical programs representing online charging systems. FIG. 1 shows production server 104 and development server 112 in direct communication with each other. In another embodiment production server 104 and development server 112 can be in data communication with each other via wide area network(s) 106. Production server 104 and development server 112 can be owned by the same business entity or separate business entities.

Each of graphical programs stored in database 114 can be accessed and modified by a user via development server 112 and client computer system 116. A graphical program can be built or modified using graphical programming tools, including a graphical program editor, as will be more fully described below. Once built or modified, a graphical program can be tested on development server before it is compiled and implemented on production server 104.

Figure 2:
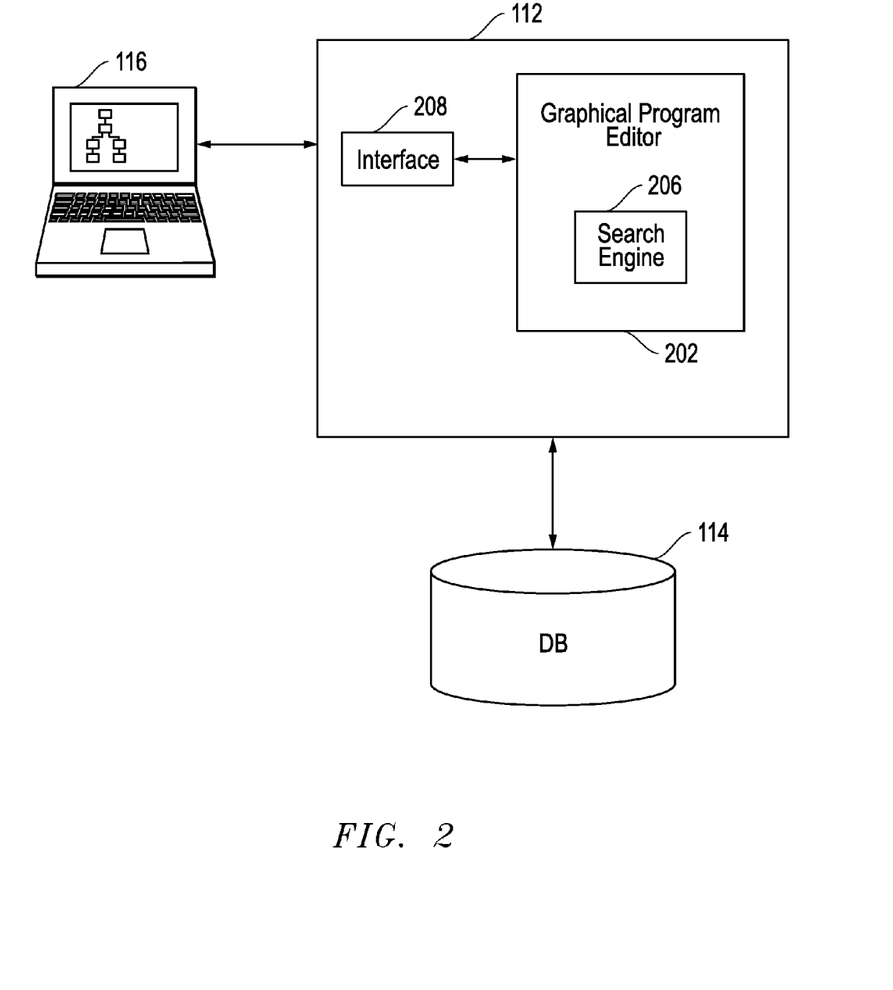
FIG. 2 illustrates components of an example development server that implements one embodiment of the present invention.

FIG. 2 illustrates in block diagram form relevant components of the development server 112 shown in FIG. 1. Development server 112 may include a graphical program editor 202, which may be implemented using a suitable combination of hardware, firmware, and software. In one embodiment, graphical program editor 202 may be implemented using instructions executing on one or more processors of server 112. These instructions can be stored in memory of server 112 after being downloaded from another computer system (not shown) via wide area network(s) 106.

Graphical program editor 202 enables a user of client computer system 116 to create a new graphical program or modify an existing graphical program stored within database 114. Graphical program editor 202 includes a search engine 206 that will be more fully described below, and is coupled to an interface module 208 that enables data communication between graphical program editor 206 and client computer system 116.

Graphical program editor 202 is capable of generating a graphical programming GUI for subsequent display on client computer system 116 via interface module 208. The GUI may include several panels including a canvas panel that displays a graphical program consisting of interconnected nodes. A user can create a new or modify an existing graphical program via the canvas panel by adding nodes, removing nodes, configuring nodes, reconfiguring nodes, connecting nodes, reconnecting nodes, etc. The GUI may include a search panel that enables a user to interface with search engine 206 and search for nodes of the displayed graphical program based on user entry of search criteria and/or user selection of one of several predefined filters. Search engine 206 can access and search data (e.g., configuration parameters, meta-data, node type, node name, node number, etc.) corresponding to displayed nodes of a graphical program in order to identify those nodes that meet the selected filter and/or search criteria. Search engine 206 gathers active links of the identified nodes as a result of a search operation. The active links can be displayed as a list in a results panel of the GUI in real time. Because the active link list is displayed in real time, the contents of the list may change as the user changes search terms. An inspector panel displays information for a selected node such as the name, comments, type, a listing of incoming nodes and node exits (and which node they are connected to), etc.

Figure 3:
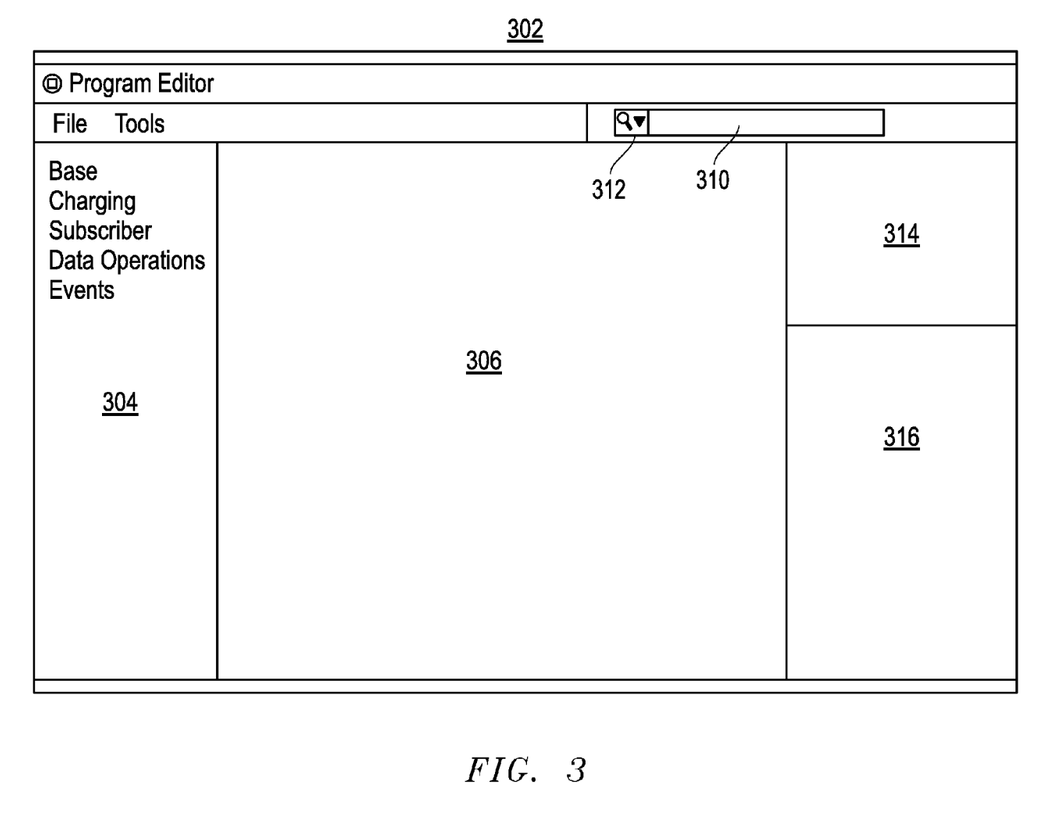
FIGS. 3-11 are graphical representations of example GUIs displayed by a computer system in accordance one embodiment of the present invention.

With continuing reference to FIG. 2, FIG. 3 illustrates an example graphical programming GUI 302 displayed on client computer system 116. GUI 302 includes a palette panel 304 that list files of nodes by type. As will be more fully described, a user of GUI 302 can drag and drop instances of nodes from palette 304 onto a canvas panel 306 during graphical program development. The user can configure or reconfigure nodes on canvas panel via a user interactive window. The user can interconnect nodes on the canvas panel 306, which in turn implements a control flow for the graphical program. The user can change the view resolution of canvas panel 306. For example, a user can contract (i.e., zoom in) or expand (i.e., zoom out) the view, which allows a user to see fewer or more nodes of the displayed graphical program.

A user can search for nodes of interest displayed on canvas 306 using the search engine 206. This function can be accessed via a canvas search box 310, which enables a user of computer 116 to enter search criteria. Also, a drop down filter menu 312 enables a user of computer 116 to select one or several predefined search filters from a menu. The search engine 206 uses the entered search criteria and/or selected filter to identify one or more nodes with configuration data, meta-data, node type, etc., that meets the search criteria and/or selected filter. The data searched includes both data of displayed nodes, and data hidden from view. Once identified, the search engine 206 provides search results in the form of a list of active links to the identified nodes. The list of links is transmitted to the client computer system 116 via interface module 208 for display in results panel 314. Each link displayed within panel 314 can be activated by the user. For example, by clicking a link within panel 314 a corresponding node within canvas panel 306 can be highlighted, centered, and/or brought into focus via automatic zoom-in. Additionally, information associated with the selected node can be displayed in an inspector panel 316. The information may include user entered comments for the node, type of node, identification of imports that can be received by the node, identification of outputs that can be generated by the node, configuration parameters entered by a user for the node, a listing of connected nodes at the input and output side, etc. The node associated information displayed within the inspector panel may be edited by the user.

Graphical Program Creation or Modification

Figure 4:
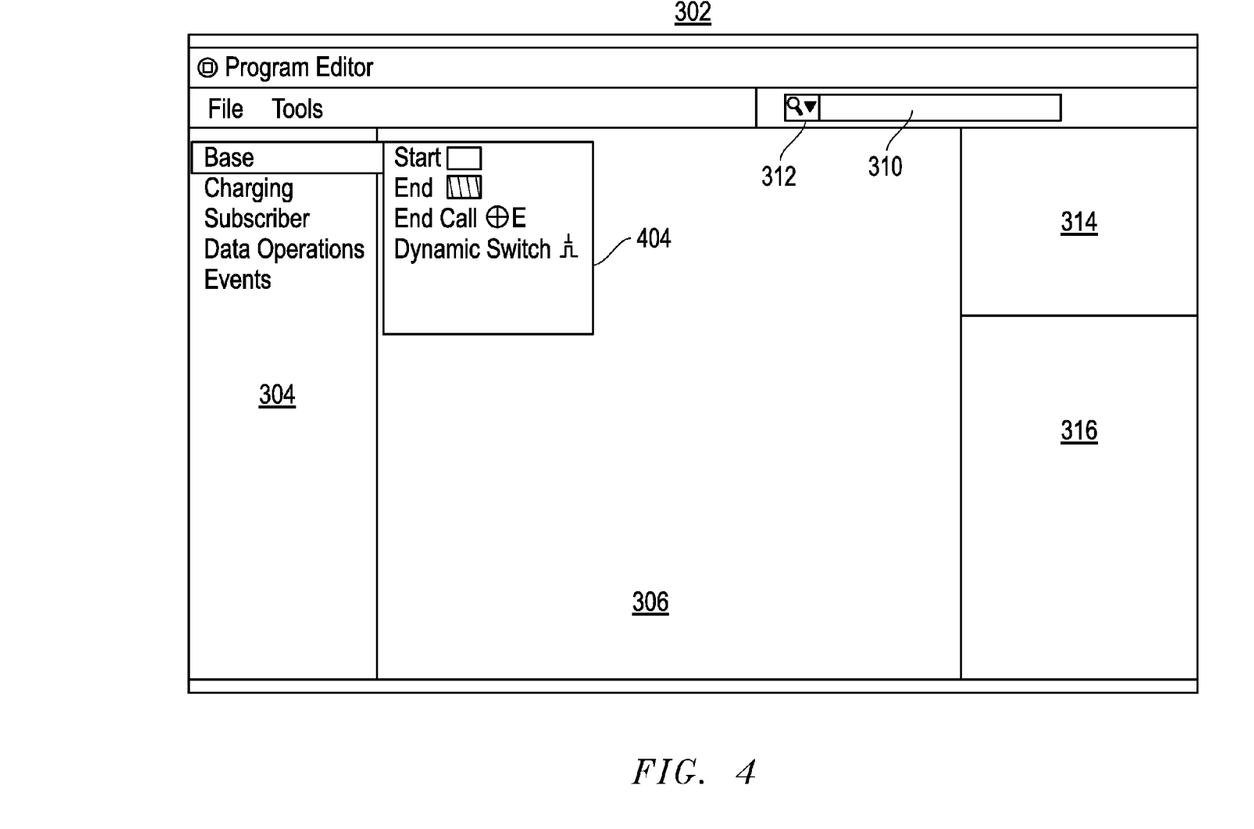
Figure 5:
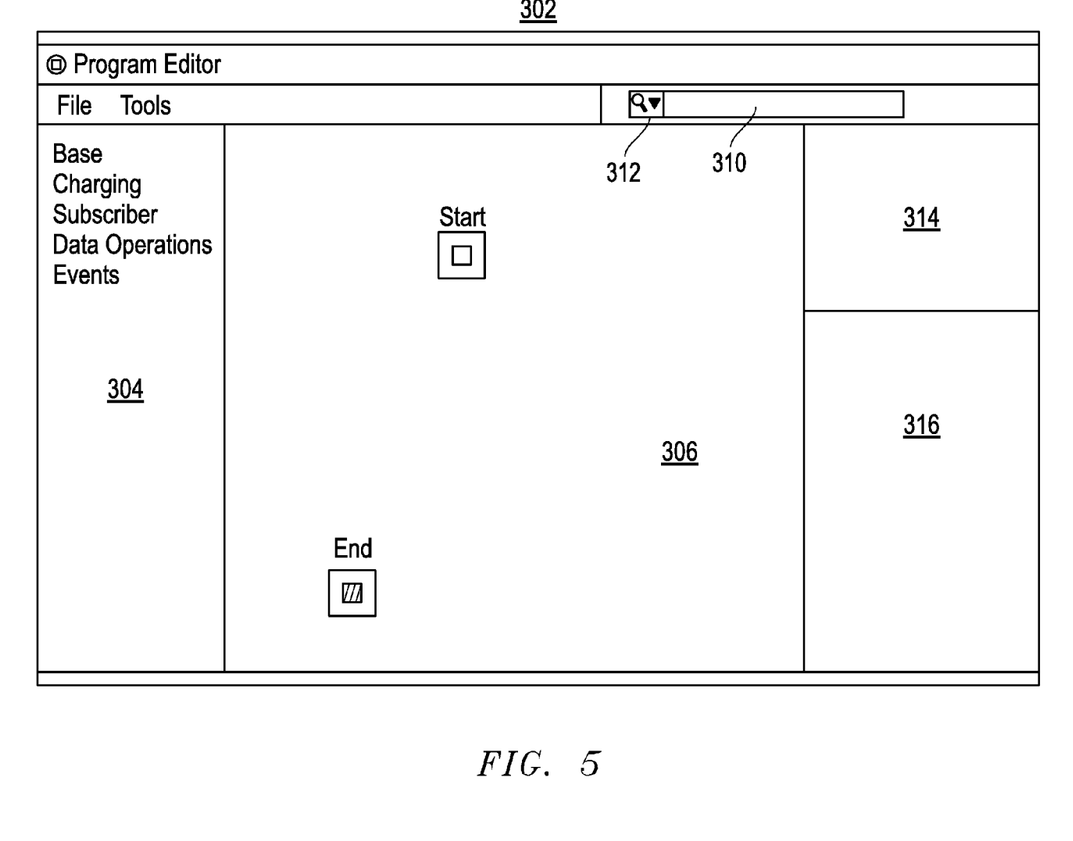
Figure 6:
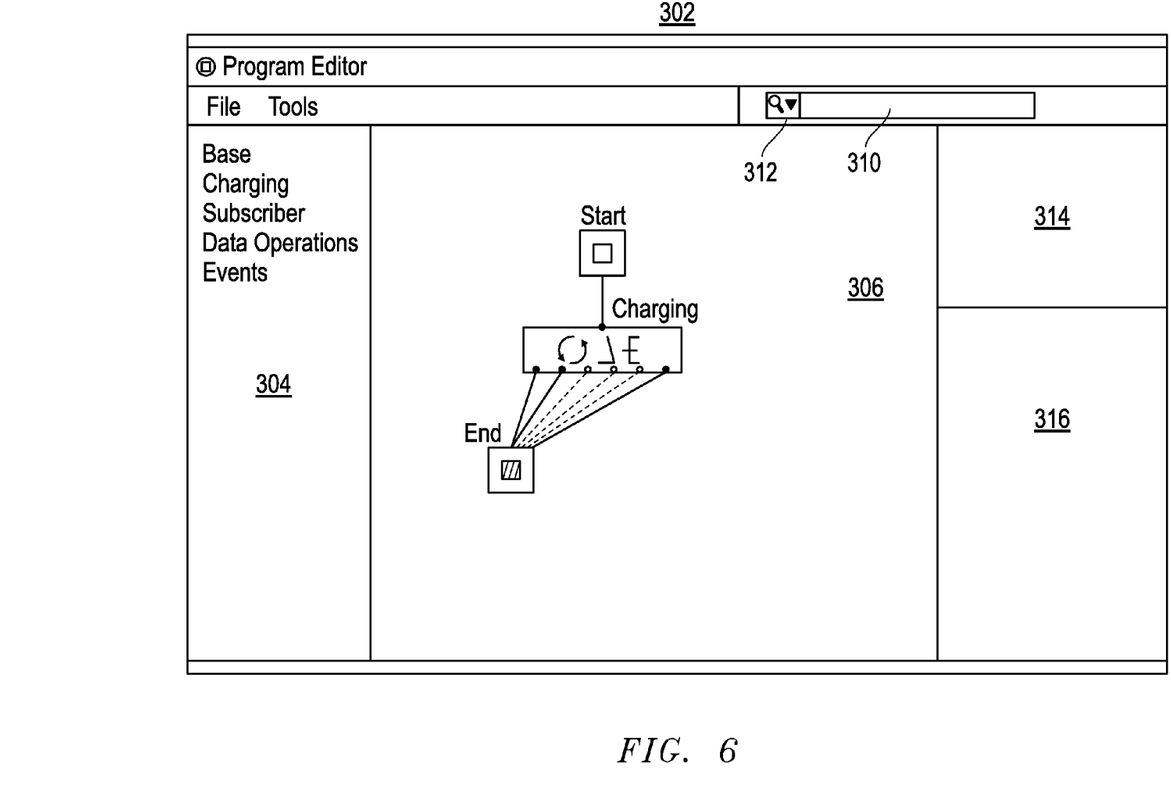
Figure 7:
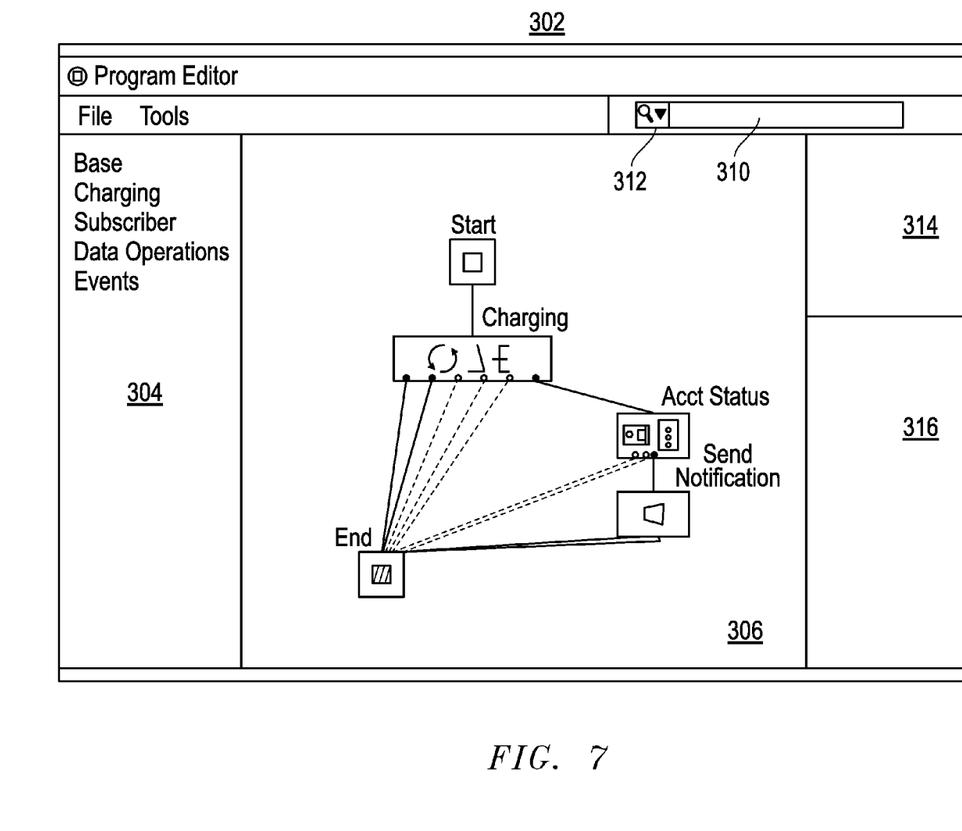

As noted a graphical program can be created or modified by, for example, a user dragging and dropping instances of nodes from palette panel 304 onto canvas panel 306, configuring or reconfiguring the nodes, connecting or reconnecting the nodes, etc. FIG. 4 illustrates the GUI 302 shown in FIG. 3 with a window 404 opened to expose several different distinct nodes that are contained within a file identified as "Base" of palette panel 304. Instances of these nodes can be dragged and dropped onto canvas panel 306. FIG. 5 illustrates the GUI after a user drags and drops an instance of a "Start" node onto canvas panel 306. Most graphical programs begin with a Start node. In like manner, an instance of the "End" node can be dragged and dropped onto the canvas panel 306 by the user. Each graphical program created using editor 202 may include several End nodes. Other nodes can be added to the graphical program displayed within canvas panel 306. FIG. 6 illustrates the GUI shown in FIG. 5 after an instance of a "Charging" node is dragged and dropped. The Charging node, which may be unique to online charging systems, functions to allow a customer to continue a telephone call if the customer has sufficient credit in his account or otherwise charges the customer for the call once the call terminates. A user may connect or reconnect nodes within the graphical program using flow control lines. In this fashion, nodes of the graphical program are placed in data communication with each other via control flow lines such that the processing results of one node can be transmitted and subsequently used by another node. FIG. 6 shows the GUI of FIG. 5 with example control lines added thereto. The graphical program shown in FIG. 6 is elementary in that it contains only three interconnected nodes. FIG. 7 illustrates the graphical program shown within FIG. 6 with additional nodes added thereto. These additional nodes can perform various processes or functions such as determining whether the customer should be sent a notification based upon profile information for the customer, sending a text message, etc.

Figure 8:
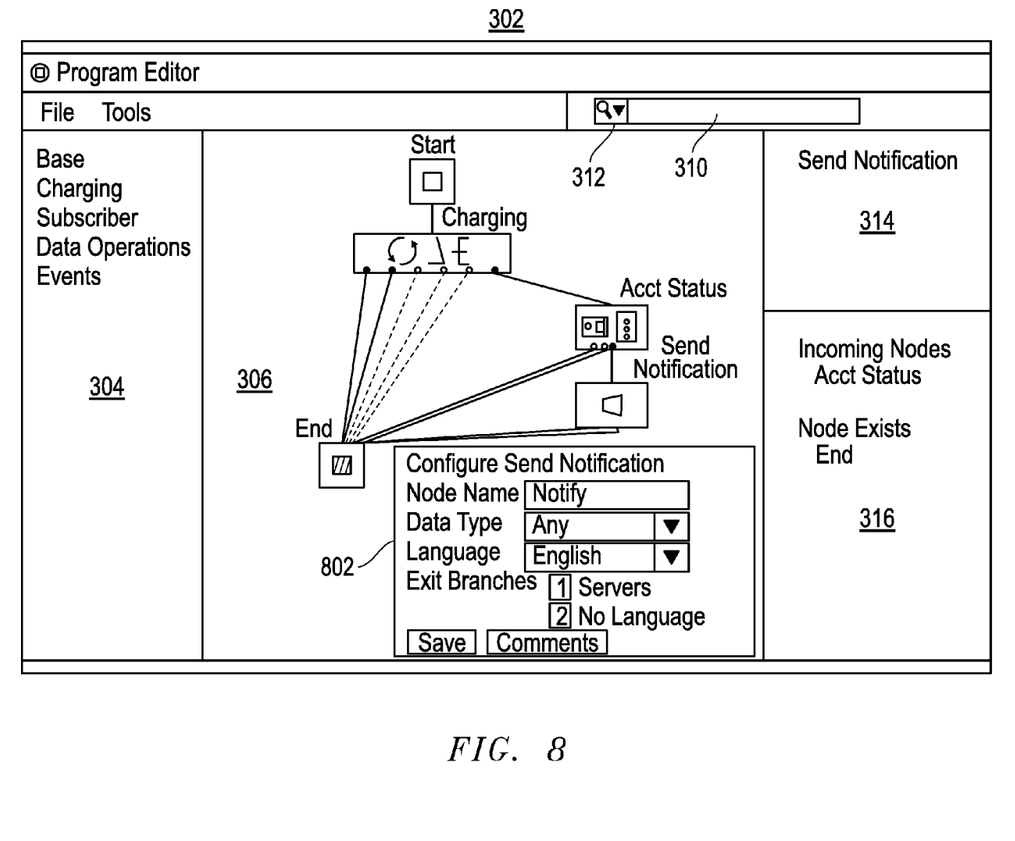

A user can configure or reconfigure a node of a graphical program. For example, a user can configure a node by defining configuration parameters or features using a pop-up window in response to double clicking the displayed in canvas panel 306. FIG. 8 illustrates a pop-up configuration window 802 that enables a user to enter configure information for the "Send Notification" node shown within canvas panel 306. Once the user adds or modifies configuration information for the node, the user can save the node's configuration by activating the "Save" button within the pop-up window. During implementation, a function implemented by a node depends on the parameters or other configuration information entered by a user for the node. In addition to displaying the pop-up configuration window, information associated with the selected node, such as the incoming nodes and the node exists, can be displayed in inspection panel 316.

Figure 9:
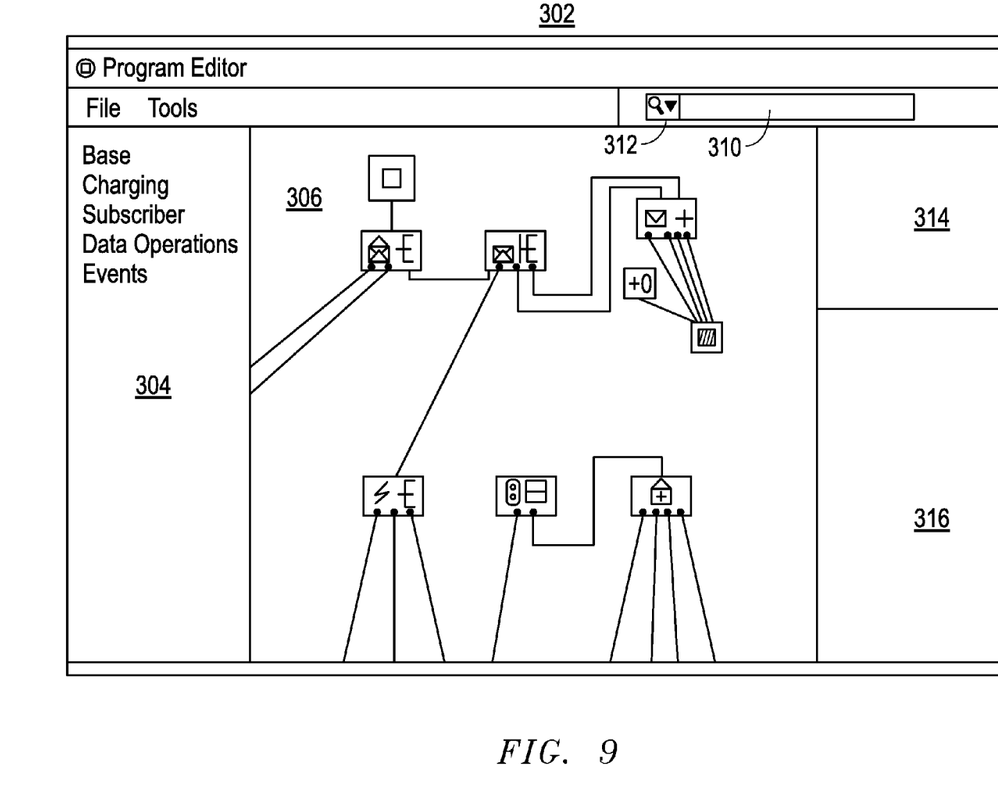

Complex graphical programs may contain hundreds or thousands of interconnected nodes. FIG. 9 illustrates a small portion of a very complicated graphical program displayed within canvas panel 306. Although programming can greatly reduce the effort and cost of building or modifying graphical programs, as the complexity and size of graphical program increase, disadvantages may be created for the user/developer. For example, as the complexity of a graphical program increases, so does the difficulty for a developer to visually locate nodes that need configuration or reconfiguration.

Node Searching

Search engine 206 can search data associated with nodes of a displayed graphical program using search criteria specified by a user and/or a filter specified by a user. The data searched by engine 206 is stored in memory and includes configuration data, meta-data, user enter comments, node type, node number, etc. Some of this data is user entered, while other data may be inherited when the instance of the node that was dragged and dropped. Search engine 206 can restrict the scope of the search using a predefined filter selected by the user. For example, with a filter setting set to "Charging Nodes," search engine 206 will search only data associated with Charging Nodes of the displayed program in order to identify those nodes with associated data that matches a search criteria entered by a user into box 310. In accordance with one embodiment of the present invention, search engine 206 can perform a live search on the node associated data. As the user enter search terms, search results in the form of links to nodes are displayed in real time.

Figure 10:
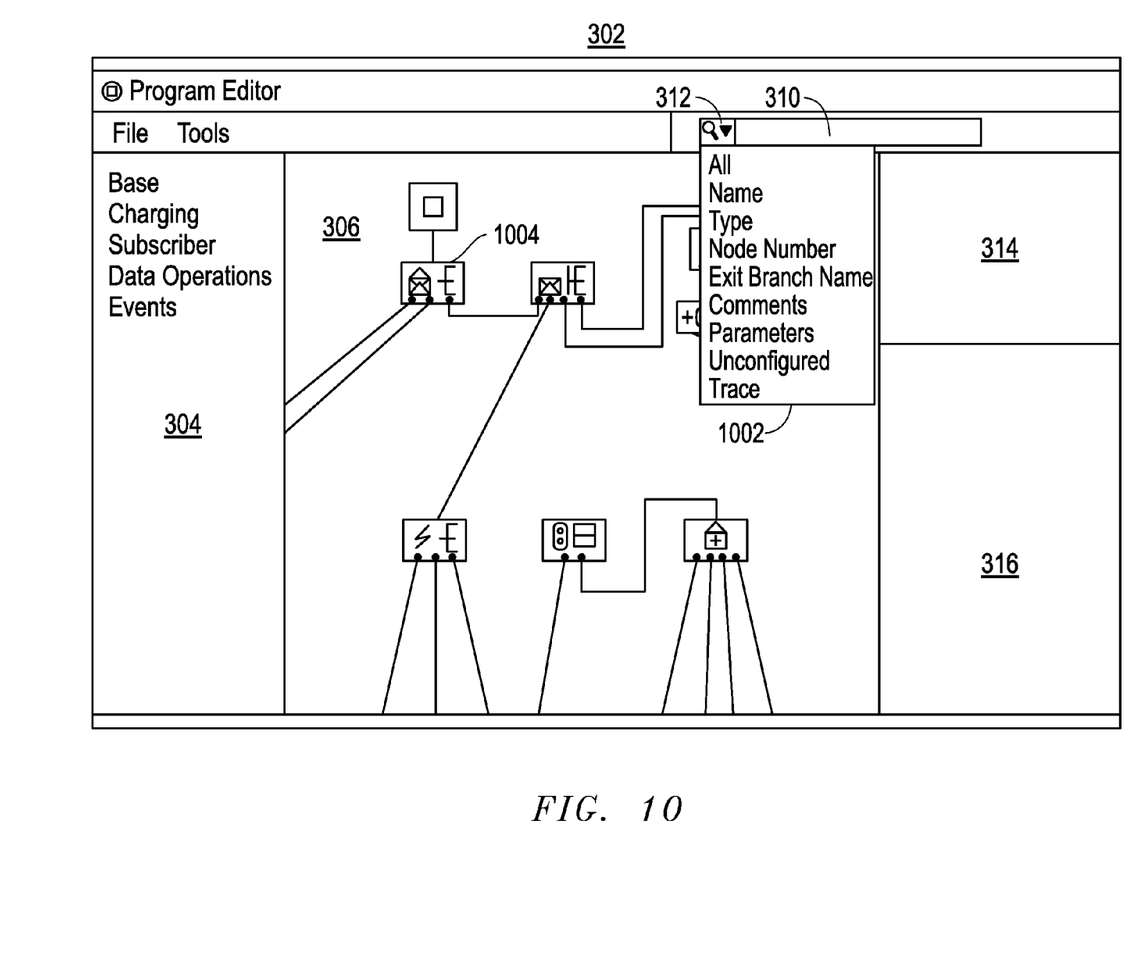

FIG. 9 illustrates GUI 302 displayed on client computer system 116 after a user opens up a more complex graphical program. The view resolution of is set to show only 9 nodes of the graphical program that may contain hundreds or thousands of interconnected nodes. Rather than attempting to visually locate a particular node or group of nodes, a user can use search engine 206. A first step may include the user selecting an appropriate filter using the drop down filter menu 312. FIG. 10 shows a listing of example filters that can be employed within one embodiment of the present invention. Example filters include All, Name, Type, Node Number, Exit Branch Name, Comments, Parameters, Unconfigured, Trace, etc. The All filter is selected when a user wants to see any node with associated data that contains the terms entered in search box 310. The Name filter, when selected, will limit search engine 206's search to those nodes whose name contains the terms entered in search box 310. The Type filter will limit search engine 206's search to those nodes whose type contains the search terms. The Node Number filter will limit search engine 206's search to those nodes whose node number matches the criteria entered in search box 310. The Comments filter will limit search engine 206's search to those nodes whose user-entered comments match the search terms. The Parameters filter, when employed, will limit search engine 206's search to those nodes with text-based integration parameters containing the terms entered in search box 310. The Unconfigured filter, as its name implies, is used to find all unconfigured nodes in the graphical program. The Trace filter, when employed, identifies nodes corresponding to a trace entered into search box 310 as will be more fully described below. Additional filters are contemplated.

Figure 11:
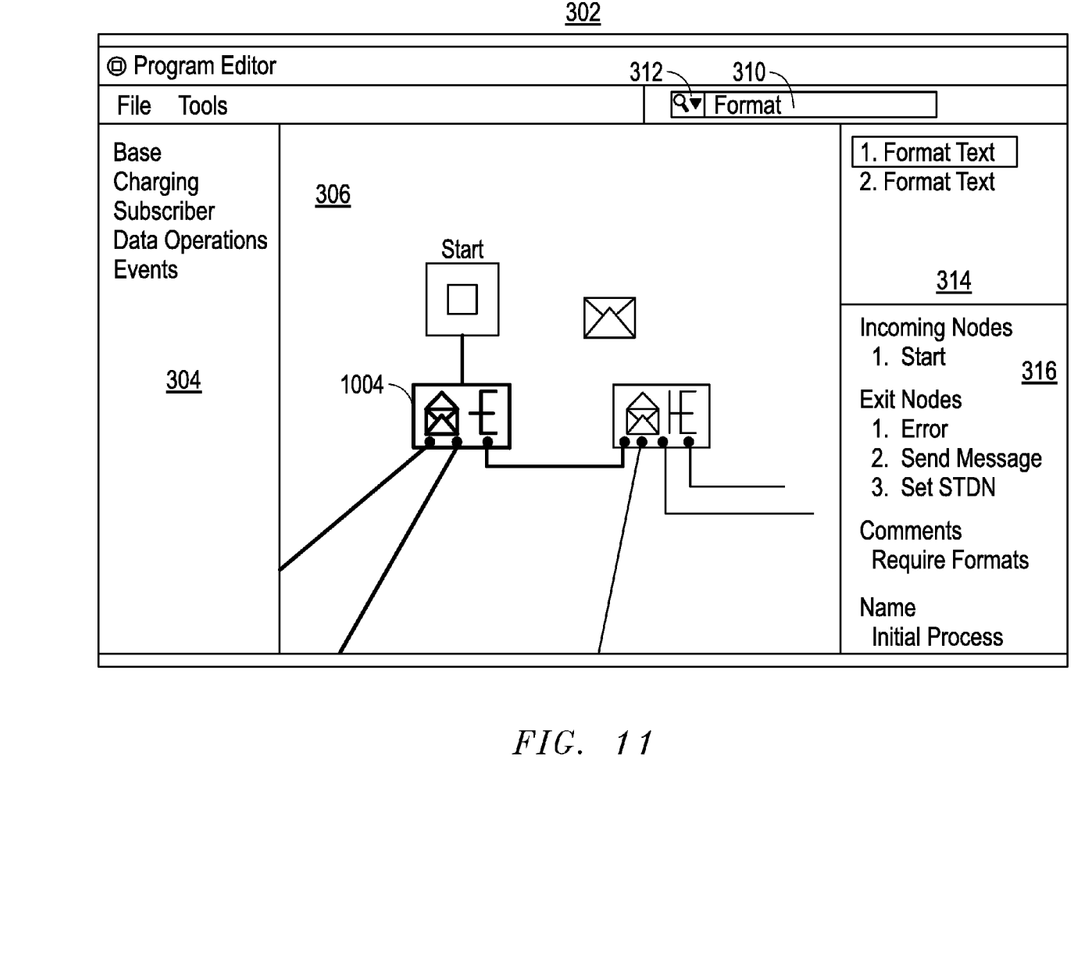

After a filter is selected by a user, the user can then enter search criteria into search box 310. To illustrate, presume a user enters "format" into search box 310 with a filter setting set to All. As the user types the text into the search box 310, the search engine 206 can access database 114, which contains information associated with the nodes displayed within canvas panel 306, to identify all nodes that contain the user entered text. Once identified, search engine 206 prepares a list of active links to the nodes for subsequent display within search results panel 314. As an aside, the content of the displayed links may include identifying information such as node numbers and node names. A user can activate one of the links displayed within the results panel, which may prompt editor 202 to highlight, center, and/or bring into focus the node corresponding to the activated link. FIG. 11 illustrates the GUI 302 shown in FIG. 10 after a user enters "Format" into search box 310, and after the user activates the first link displayed in the results panel 3124. As shown in FIG. 11, node 1004, which corresponds to the first link in results panel 314, and its connections to other nodes are highlighted and centered within canvas panel 306. Additionally, inspector panel 316 displays some information for node 1004 such as the node's name, comments, type, incoming nodes, node exits, etc. A user can modify information contained within inspector panel 316, or a user can add new information. Additionally, a user can reconfigure functional aspects by double clicking the highlighted node within canvas panel 306. Double clicking the highlighted node results in a pop-up window that displays parameters or other configuration data for the node. The parameters and other configuration data can be modified and saved by the user. A user can activate another of the links contained within results panel 314.

Trace Searching

When the graphical program is created and finalized using editor 202, the graphical program can be compiled and subsequently exported for implementation on production server 104 shown within FIG. 1. During implementation, the online charging system can process, for example, a request associated with a telephone call. The result generated by the online charging system depends upon data contained within the request, data contained within a profile for a customer in database 110, etc. Because requests, data contained within requests and data contained customer profiles all vary, the trace or flow through the graphical program representation of the online charging system may vary. With each request received and processed by the online charging system, a service record is created and stored within memory. This service record may include a trace, which lists identities of nodes in the corresponding graphical program that were sequentially traversed when the online charging system processed the corresponding request.

Online charging systems and their underlying graphical programs often contain logic bugs. CPSs seek to review the logic when glitches are discovered. A trace associated with a glitch can be used to review the logic and identify a bug. To illustrate, a customer may complain that he was improperly charged for a phone call, or that he received an improper text. In response, a developer can retrieve a trace for the call in question, enter the trace into the search box 310, and select Trace filter from drop down menu 312. In response, search engine 206, using the node identities contained within the trace, generates a list of active links to nodes in the graphical program that correspond to the trace identities, respectively. This active link list can be displayed in the results panel. Additionally, editor 202 can reconfigure the view of the graphical program on canvas panel 306, highlight the nodes identified in the trace, and highlight the connections therebetween. This may involve resizing (e.g., zooming in or zooming out) so that canvas panel 306 displays all the highlighted nodes. Any of the highlighted nodes contained within the canvas panel can be activated by double clicking to produce a pop-up window of associated information such as configuration parameters for the node. Additionally, information associated with the double-clicked node can be displayed in inspector panel 316. A user can make modifications to the information displayed in the inspector panel or information displayed in the pop-up window. Using this method, a user can more easily identify and correct bugs within the graphical program.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

I claim:

1. A method comprising:
  searching information stored in memory using search criteria that was entered into a search box of a Graphical User Interface, wherein
    the information searched is associated with nodes of a graphical program, the graphical program was created by using one or more graphical programming tools to add the nodes via the Graphical User Interface,
    the search criteria corresponds to a subset of the nodes within the graphical program, the subset of the nodes correspond to one or more of:
      (a) a flow path through the graphical program; or
      (b) text identified in the search criteria;
    one or more of the subset of the nodes represents a function that manipulates one or more input variables and/or produces one or more output variables; and
  identifying the subset of nodes, based on the search criteria, by searching the information;
  displaying search results comprising an identification of one or more of the subset of nodes.

2. The method of claim 1, further comprising displaying one or more links corresponding to one or more of the subset of nodes.

3. The method of claim 2, further comprising:
  in response to user activation of a first link of the one or more links, displaying information related to a first node of the subset of nodes, wherein the first link corresponds to the first node.

4. The method of claim 2, further comprising:
  displaying the graphical program; and
  in response to user activation of a first link of the one or more links, highlighting a first node of the subset of nodes, wherein the first link corresponds to the first node.

5. The method of claim 2, further comprising:
  displaying the graphical program; and
  in response to user activation of a first link of the one or more links, highlighting control flow connections to a first node of the subset of nodes, wherein the first link corresponds to the first node.

6. The method of claim 2, further comprising:
  displaying the graphical program within a panel of the Graphical User Interface; and
  in response to user activation of a first link of the one or more links, reconfiguring a resolution of the panel so that a first node of the subset of nodes is centered within the panel, wherein the first link corresponds to the first node.

7. The method of claim 2, further comprising:
  displaying the graphical program within a panel of the Graphical User Interface,
  wherein the one or more links are displayed in the GUI concurrently with the displayed graphical program.

8. The method of claim 1, wherein the information searched is limited to a subset of information that is defined by a filter selected by a user.

9. The method of claim 1, further comprising:
  compiling instructions stored in memory, wherein the instructions represent the graphical program, and
  transmitting the compiled instructions to a computer system for implementation on the computer system.

10. The method of claim 1, wherein the search criteria comprises a first set of node identities for a first set of the nodes, respectively, within the graphical program, wherein the first set of nodes represents a flow path through the graphical program.

11. A non-transitory computer readable medium comprising instructions which, when executed by one or more hardware processors, cause performance of operations comprising:
  searching information stored in memory using search criteria that was entered into a search box of a Graphical User Interface, wherein
    the information searched is associated with nodes of a graphical program, the graphical program was created by using one or more graphical programming tools to add the nodes via the Graphical User Interface,
    the search criteria corresponds to a subset of the nodes within the graphical program, the subset of the nodes correspond to one or more of:
      (a) a flow path through the graphical program; or
      (b) text identified in the search criteria;
    one or more of the subset of the nodes represents a function that manipulates one or more input variables and/or produces one or more output variables; and
  identifying the subset of nodes, based on the search criteria, by searching the information;
  displaying search results comprising an identification of one or more of the subset of nodes.

12. The non-transitory computer readable medium of claim 11, wherein the operations further comprise displaying one or more links corresponding to one or more of the subset of nodes.

13. The non-transitory computer readable medium of claim 12, wherein the operations further comprise:
  in response to user activation of a first link of the one or more links, displaying information related to a first node of the subset of nodes, wherein the first link corresponds to the first node.

14. The non-transitory computer readable medium of claim 12 wherein the operations further comprise:
- displaying the graphical program; and
- in response to user activation of a first link of the one or more links, highlighting a first node of the subset of nodes, wherein the first link corresponds to the first node.

15. The non-transitory computer readable medium of claim 12, wherein the operations further comprise:
- displaying the graphical program; and
- in response to user activation of a first link of the one or more links, highlighting control flow connections to a first node of the subset of nodes, wherein the first link corresponds to the first node.

16. The non-transitory computer readable medium of claim 11, wherein
- at least one of the nodes supports a charging function, and the charging function is related to charging a user for using a service.

17. The non-transitory computer readable medium of claim 16, wherein the charging function is configured to allow the user to continue the service if the user has sufficient credit in an account associated with the user.

18. The non-transitory computer readable medium of claim 16, wherein the charging function is configured to charge the user for the service after the user uses the service.

19. The non-transitory computer readable medium of claim 11, wherein the graphical program is configured for execution on a single computer system.

20. A system comprising:
- at least one device including a hardware processor;
- the system being configured to perform operations comprising:
  - searching information stored in memory using search criteria that was entered into a search box of a Graphical User Interface, wherein
    - the information searched is associated with nodes of a graphical program, the graphical program was created by using one or more graphical programming tools to add the nodes via the Graphical User Interface,
    - the search criteria corresponds to a subset of the nodes within the graphical program, the subset of the nodes correspond to one or more of:
      - (a) a flow path through the graphical program; or
      - (b) text identified in the search criteria;
    - one or more of the subset of the nodes represents a function that manipulates one or more input variables and/or produces one or more output variables; and
  - identifying the subset of nodes, of based on the search criteria, by searching the information;
  - displaying search results comprising an identification of one or more of the subset of nodes.

21. The system of claim 20, wherein the operations further comprise displaying one or more links corresponding to the one or more of the subset of nodes.

22. The system of claim 21, wherein the operations further comprise:
- in response to user activation of a first link of the one or more links, displaying information related to a first node of the subset of nodes, wherein the first link corresponds to the first node.

23. The system of claim 21, wherein the operations further comprise:
- displaying the graphical program; and
- in response to user activation of a first link of the one or more links, highlighting a first node of the subset of nodes, wherein the first link corresponds to the first node.

24. The system of claim 21, wherein the operations further comprise:
- displaying the graphical program; and
- in response to user activation of a first link of the one or more links, highlighting control flow connections to a first node of the subset of nodes, wherein the first link corresponds to the first node.

* * * * *